United States Patent [19]

Engel et al.

[11] Patent Number: 5,615,323
[45] Date of Patent: Mar. 25, 1997

[54] DISPLAYING RESOURCE PERFORMANCE AND UTILIZATION INFORMATION

[75] Inventors: Ferdinand Engel, Northboro; Wilson T. MacDonald, Holliston; Arthur P. Hamlin, Belmont, all of Mass.

[73] Assignee: Concord Communications, Inc., Marlboro, Mass.

[21] Appl. No.: 614,192

[22] Filed: Mar. 12, 1996

Related U.S. Application Data

[63] Continuation of Ser. No. 334,194, Nov. 4, 1994, abandoned.

[51] Int. Cl.$^6$ ................................................ G06F 15/00
[52] U.S. Cl. ........................................................ 395/140
[58] Field of Search ................................ 395/140, 155, 395/161; 370/13, 17; 345/119, 121

[56] References Cited

U.S. PATENT DOCUMENTS

| | | | |
|---|---|---|---|
| 4,817,080 | 3/1989 | Soha | 370/17 |
| 4,959,854 | 9/1990 | Cave et al. | 379/157 |
| 5,101,402 | 3/1992 | Chiu et al. | 370/17 |
| 5,111,531 | 5/1992 | Grayson et al. | 395/23 |
| 5,247,517 | 9/1993 | Ross et al. | 370/85.5 |
| 5,251,152 | 10/1993 | Notess | 364/550 |
| 5,315,580 | 5/1994 | Phaal | 370/13 |
| 5,339,389 | 8/1994 | Bates et al. | 395/153 |
| 5,353,398 | 10/1994 | Kitahara et al. | 395/153 |

FOREIGN PATENT DOCUMENTS

| | | |
|---|---|---|
| 2099414 | 4/1994 | Canada . |
| WO94/14118 | 6/1994 | WIPO . |

OTHER PUBLICATIONS

F.J. Derfler, Jr., "Who's Minding Your Network?", PC Magazine/Networking/Network Management, Nov. 8, 1994 (pp.237–285).

*Primary Examiner*—Phu K. Nguyen
*Attorney, Agent, or Firm*—Fish & Richardson P.C.

[57] ABSTRACT

A method of displaying information relating to performance of a computer resource over a preselected period of time, wherein the computer resource is connected to a communication network and the method includes the steps of: from a location on the network that is remote from the computer resource, periodically sampling data relating to performance of the resource so as to generate stored values for a preselected performance variable for that resource, wherein the periodic sampling takes place over a preselected period of time and the preselected performance variable takes on values within a specified range of possible values; dividing the specified range of possible values for the preselected performance variable into a plurality of subranges; for each subrange, determining for what proportion of the preselected period, the values of the preselected performance variable fall within that subrange; and for each subrange, displaying in graphical form the proportion of the preselected period of time that the values of the preselected performance variable fell within that subrange.

20 Claims, 6 Drawing Sheets

SITUATIONS TO WATCH

| RANK | SEGMENT NAME | VARIABLE | CURRENT AVERAGE | THRESHOLD VALUE | DAYS TO THRESHOLD |
|---|---|---|---|---|---|
| 1 | 182.124.56.0 | COLLISIONS | 22% | 16% | - |
| 2 | 182.124.22.0 | ETHERNET UTILIZATION | 7% | 8% | 4 |
| 3 | 182.124.11.0 | TOKEN RING HARD ERRORS | 100/hr | 125/hr | 7 |
| 4 | 182.124.14.0 | TOKEN RING SOFT ERRORS | 475/hr | 600/hr | 12 |
| 5 | 182.124.24.0 | BROADCASTS | 220/s | 300/s | 18 |
| 6 | 182.124.50.0 | TOKEN RING CAPACITY | 16% | 22% | 19 |
| 7 | 182.124.25.0 | COLLISIONS | 14% | 21% | 21 |
| 8 | 182.124.16.0 | ETHERNET ERRORS | 4% | 6% | 24 |
| 9 | 182.124.19.0 | TOKEN RING HARD ERRORS | 80/hr | 125/hr | 29 |
| 10 | 182.124.29.0 | TOKEN RING HARD ERRORS | 65/hr | 125/hr | 30 |

| POLLING TIME STAMP | SEGMENT NAME | BYTES TRANSFERRED (MB) |
|---|---|---|
| 11:30am | 192.124.56.0 | 225 |
| 11:30am | 192.124.22.0 | 102 |
| 11:30am | 192.124.11.0 | 435 |
| 11:30am | 192.124.14.0 | 96 |
| 11:30am | 192.124.24.0 | 36 |
| ... | ... | ... |

FIG. 6

BANDWIDTH UTILIZATION

| TIME STAMP | TOTAL BYTES | SN | 0.00-0.09 | 0.10-0.19 | 0.20-0.29 | 0.30-0.39 | 0.40-0.49 | 0.50-0.59 | 0.60-0.69 | 0.70-0.79 | 0.80-0.89 | 0.90-1.00 |
|---|---|---|---|---|---|---|---|---|---|---|---|---|
| 11:30am | 225 | ...56 | 0 | 0 | 1 | 0 | 0 | 0 | 0 | 0 | 0 | 0 |
| 11:30am | 102 | ...22 | 1 | 0 | 0 | 0 | 0 | 0 | 0 | 0 | 0 | 0 |
| 11:30am | 435 | ...11 | 0 | 0 | 0 | 1 | 0 | 0 | 0 | 0 | 0 | 0 |
| 11:30am | 96 | ...14 | 0 | 1 | 0 | 0 | 0 | 0 | 0 | 0 | 0 | 0 |
| 11:30am | 36 | ...24 | 0 | 0 | 0 | 0 | 0 | 1 | 0 | 0 | 0 | 0 |
| 11:30am | ... | ... | ... | ... | ... | ... | ... | ... | ... | ... | ... | ... |

FIG. 7

| SEGMENT NAME | SPEED (MAX POSS. BYTES TRANSFERRED PER SECOND) (MB) |
|---|---|
| 192.124.56.0 | 1.25 |
| 192.124.22.0 | 1.25 |
| 192.124.11.0 | 1.25 |
| 192.124.14.0 | 1.25 |
| 192.124.24.0 | 1.25 |
| ... | ... |

FIG. 8

SEGMENT TABLE

| SN | 0-9 | 10-19 | 20-29 | 30-39 | 40-49 | 50-59 | 60-69 | 70-79 | 80-89 | 90-100 | TP |
|---|---|---|---|---|---|---|---|---|---|---|---|
| ...56 | 42 | 33 | 10 | 11 | 0 | 0 | 0 | 0 | 0 | 0 | 96 |
| ...22 | 30 | 35 | 5 | 26 | 0 | 0 | 0 | 0 | 0 | 0 | 96 |
| ...11 | 27 | 50 | 8 | 11 | 0 | 0 | 0 | 0 | 0 | 0 | 96 |
| ...14 | 80 | 11 | 4 | 0 | 0 | 0 | 0 | 0 | 0 | 0 | 96 |
| ...24 | 66 | 10 | 4 | 16 | 0 | 0 | 0 | 0 | 0 | 0 | 96 |
| ... | ... | ... | ... | ... | ... | ... | ... | ... | ... | ... | |

1

DISPLAYING RESOURCE PERFORMANCE AND UTILIZATION INFORMATION

This is a continuation of application Ser. No. 08/334,194, filed Nov. 4, 1994, now abandoned.

BACKGROUND OF THE INVENTION

Computer networks link computers together to allow them to exchange information and communicate with each other over a distance. Some of these networks, known as local area networks, operate within a small geographical area such as a building or a portion of a building. Other networks, known as wide-area networks, operate over a wider geographical area and link computers located in different towns, states, and countries.

Computer networks can become quite large and complex, involving many components and devices that are essential for the services they provide. Like any large, complex electrical system, problems can occur which impair performance. Even when a network operates flawlessly, the increase in demand for network resources can exceed capacity and when this happens the users will experience a deterioration in performance.

The tasks of maintaining the network, adding computer resources when needed, reconfiguring the network to support changing patterns of usage and greater user demands, and solving the problems which occasionally occur are typically the responsibility of a network administrator. To effectively and efficiently carry out those responsibilities, the network administrator must be able to quickly determine how well even the most remote sections of the network are performing and to detect the occurrence of problems or a deterioration in performance that hints at the beginning of more serious problems.

Devices referred to generally as network monitors are available to assist the network administrators in determining what is happening with the network. Some of these devices, when connected to the network, gather, store and display a staggering amount of data relating to many different aspects of the networks performance and utilization. Though a tremendous amount of information is available through such devices, there has been a continuing need for more effective ways of presenting that information to the user so that it is readily accessible and easily understandable.

SUMMARY OF THE INVENTION

The present invention is a new and effective way of presenting information about the performance and utilization of remotely located resources that are accessible through a network, such as a computer network.

In general, in one aspect, the invention is a method of displaying information relating to performance over a preselected period of time of a computer resource that is connected to a communication network. The method includes the step of periodically sampling over the network data relating to performance of the resource so as to generate stored values for a preselected performance variable for that resource. The periodic sampling taking place over a preselected period of time and the preselected performance variable takes on values within a specified range of possible values. The method also includes dividing the specified range of possible values for the preselected performance variable into a plurality of subranges; for each subrange, determining for what proportion of the preselected period, the values of the preselected performance variable fall within that subrange; and for each subrange, displaying in graphical form the proportion of the preselected period of time that the values of the preselected performance variable fell within that subrange.

In preferred embodiments, the step of determining involves first determining for each of the stored values of the preselected performance variable within the preselected period of time which of the plurality of subranges it falls into; and then, counting the number of times that a stored value falls into each of said subranges to determine for what proportion of the preselected period the values of the preselected performance variable fall within that subrange.

In general, in another aspect, the invention is a method of reporting information about a resource that is connected to a communications network. The method involves the steps of: periodically sampling over the network data relating to performance of the resource so as to generate stored values for a preselected performance variable for that resource; collecting stored values representing a baseline period of time; setting a threshold value for the preselected performance variable; analyzing the stored values representing the baseline period to predict a time-to-threshold number, where the time-to-threshold number is the period of time that is expected to elapse from a present time to a later time at which a predicted value of the preselected performance variable will reach the threshold value; and generating a report that presents the time-to-threshold number for the preselected performance variable.

The invention presents network monitoring information to a network administrator in a way that is compact, meaningful, and easily understandable. Using stack bars positioned side-by-side, the bandwidth utilization chart shows distributions of bandwidth utilization throughout a selected period (e.g., a day) for many segments of the network at once. The chart allows the network administrator to determine, at a glance, percentages of the day for which individual network segments were operating at various levels of bandwidth utilization.

Another aspect of the invention relating to the Situations to Watch presents a sorted list of entries, each entry of which identifies a network segment, a performance or utilization variable for that segment, and a days-to-threshold number. The days-to-threshold number is a prediction of the remaining number of days until the corresponding performance or utilization variable reaches a threshold level. The list is sorted in order of increasing days-to-threshold numbers starting with the variable that has the fewest days to threshold. The Situations to Watch report enables the network administrator to quickly and easily identify where network problems may arise in the near future, to determine how imminent those problems are, and to prioritize dealing with those situations.

BRIEF DESCRIPTION OF THE DRAWINGS

FIG. 3 is an example of a Situations to Watch report;

FIG. 5 shows the structure of the table that is used for storing the polled data received from the network monitors;

FIG. 6 shows the structure of the table containing buckets for indicating the average utilization for each segment and for each polling cycle;

FIG. 7 shows the structure of the table data structure for storing segment speeds;

FIG. 8 shows the structure of the segment table data structure;

DESCRIPTION OF THE PREFERRED EMBODIMENTS

The Network

Figure 1:
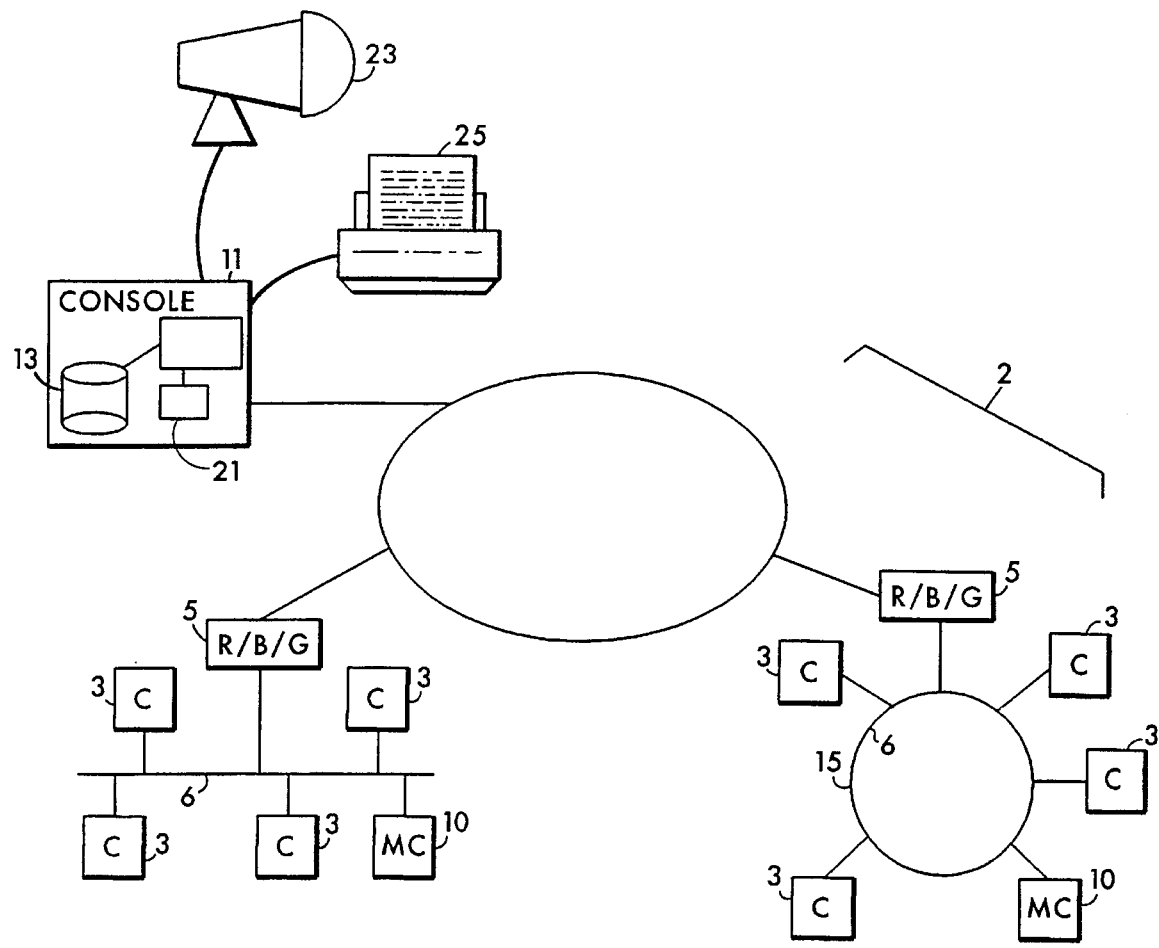
FIG. 1 shows a block diagram of a representative network.

Referring to FIG. 1, a large wide area network 2 is typically made up of a collection of smaller segments 6 to which are connected a number of components 3, such as workstations, PC's, servers, etc. Typically, the segments handle local traffic or communications between the components that are connected to the segment. The segments, in turn, are connected to the larger network through routers, bridges and/or gateways (represented in FIG. 1 by a box labeled R/B/G 5) which allow a component on one segment to communicate with a component on another segment. The segments 6 are of various types and topologies. For example, there are Token Ring networks that are, as their name implies, in the form of a ring, and there Ethernet segments, ATM lines, links, and wires that are simply open ended lines or buses to which the components are connected. For purposes of the following description, segments will be used in a general sense and is meant to include any element which handles communications between components, including all of the various network topologies and media that are used to handle local communications among a group of components.

Each segment 6 consists of a particular media type, e.g. wire, coax, twisted pair, fiber optic cable, and communications over each segment 6 are handled in accordance with one or more network protocols, such as Ethernet, Token Ring, FDDI, ATM, etc. The protocol establishes the rules for communicating data over the underlying media. For example, if packets are used for data transfer, the protocol specifies the format, size and structure of the packets, the rules for accessing the media, the rules for handling collisions between packets sent from different sources, etc. In addition, each media type and the protocol used for communication over that media is typically characterized by a maximum data transfer rate or speed. For example, the maximum rate of data transfer over an Ethernet segment is 1.25 megabytes (MB) per second.

In the described embodiment, a network monitoring device 10 is connected to each segment and gathers utilization and performance statistics about communications over the segment 6. On some of the segments, the network monitoring device 10 is a network management card that is plugged into a switching hub (not shown) that is used to programmably configure or reconfigure the segment 6. On other segments, the network monitoring device 10 is a standalone unit that is connected to the segment and which is dedicated to passively monitoring all communications over the segment. It should be noted that network monitor is used herein to encompass any network device or component that counts and/or collects information about the performance of the network and/or any components connected thereto.

The utilization and performance statistics which are gathered by the monitor devices include, among other data, the number bytes transferred, the number of collisions, the number of errors (e.g. Ethernet errors, Token Ring hard errors, Token Ring soft errors), broadcast and multicast utilization, to name a few. As a rule the monitoring device 10 records and stores these statistics internally in corresponding counters. Thus, for example, there will be a counter that records the total number of bytes that have been transferred over the segment since some initialization time at which the count was begun.

In the described embodiment, each monitoring device 10 supports a protocol known as MIB (Management Information Base) which defines a convention for identifying and requesting the contents of specific counters that are maintained by the monitoring device. The various counters are identified by corresponding MIB variables. When a MIB variable of a particular value is requested, the contents of the corresponding counters are supplied by the monitoring device to the requestor. The communication of requests to the monitoring device and the communication of replies are handled in accordance with a standard, commonly used protocol, i.e., the SNMP protocol (Simple Network Management Protocol).

It should be noted, however, that the invention is not limited to using a MIB. It also covers using any other similar mechanism for storing and retrieving information.

Figure 2:
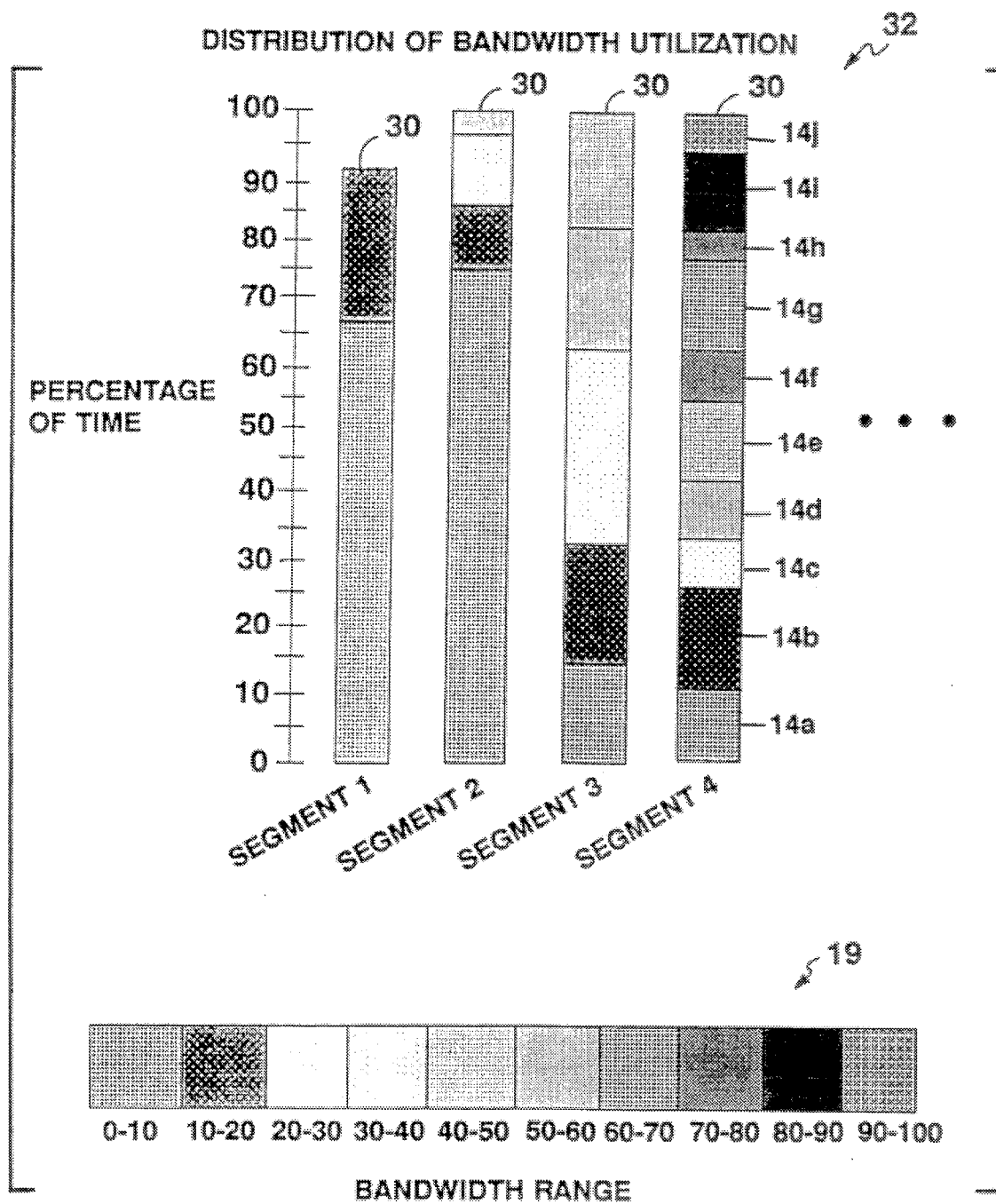
FIG. 2 is an example of a bandwidth utilization chart.

A console 11, which may be connected anywhere on the network, provides a network administrator with a mechanism by which the performance and utilization statistics that are gathered by the network monitors on each of the segments throughout the network can be accessed, manipulated, analyzed, and displayed at a single remote location. Console 11, which includes a computer and a data storage unit 13, periodically polls each of the network monitors 10 throughout the network for specific data. When the requested data is sent back to the console by the network monitors, it is stored in the data storage unit 13. A software program, referred to hereinafter as a report generator 21, then processes the utilization and performance data that has been collected for a preselected period of time to generate reports for the network administrator. Two of the reports that have particular relevance to this invention are a bandwidth utilization chart, an example of which is shown in FIG. 2, and a Situations to Watch report, an example of which is shown in FIG. 3. These reports are presented to the user as an image on a video display screen or as a printed report generated by a local printer 25.

Bandwidth Utilization Chart

Referring first to FIG. 2, the bandwidth utilization chart 32, by means of a set of stack bars 30, displays how bandwidth utilization was distributed over time for each of the segments in the network for a user selectable period of time. There is a separate stack bar 30 for each of the segments. Each stack bar 30 shows, for each range of bandwidth utilization, the proportion of the preselected period of time (e.g. a day) that average short term utilization spent in that range of bandwidth utilization. Each stack bar 30 is made up of sections (see for example sections 14a–j of the right most stack bar in FIG. 2). Each of the sections 14a–j has an associated color or shading and a relative height. The color or shading of a section indicates the bandwidth utilization range represented by that section 14. For example, in FIG. 2 the shading of the section 14e represents a bandwidth utilization of 40%–50%. The height of each of the sections 14a–j indicates an amount of time, as a percentage of a day, that the average bandwidth utilization for the corresponding segment was within the range identified by the color or shading. For example, again in FIG. 2, the height of the second section 14a indicates that for about 11% of the day segment 4 fell within the 10%–20% range of bandwidth utilization.

For the convenience of the user, a key 19 is presented in the display which translates the various shadings or colors to the corresponding range of bandwidth utilization.

The total height of a stack bar 30 is a sum of the heights of all of the sections. If the segment was fully operational and all bandwidth utilization statistics for it were successfully gathered throughout the day, the total height will be 100%. However, if the segment was not operational throughout the day or less than all bandwidth utilization statistics were successfully gathered, the total height 16 will be less than 100%. In the latter case, a resulting white space above the bar 30, i.e., a discrepancy between 100% and the total height, will be displayed. Thus the white space presents additional useful information to the network administrator. For example, in FIG. 2, the total height of the stack bar for SEGMENT 1 is about 92%, indicating that about 8% of the day's total number of possible polls for that segment were unsuccessful because either the segment was inoperative or there was interference with the polling procedure.

Situations to Watch Report

Referring to FIG. 3, the Situations to Watch report 40 is a sorted list of entries 38, each of which identifies a network segment, a performance variable for that segment, and a days-to-threshold number for that performance variable. By a performance variable, we mean any indicator of the behavior of devices and/or components of the network, including errors and volume of traffic or use, as discussed herein. The days-to-threshold number is a prediction of the number of days remaining until the corresponding performance variable reaches or exceeds a user-selectable threshold level. The threshold level represents the lower bound of warning zone for the corresponding performance variable. It may be chosen on the basis of past experience as an indicator of a region of operation that the network administrator wants to avoid because it represents an unacceptable decline in network performance or an increased likelihood of problems. In other words, it is a level at which the network administrator needs to begin taking action to address impending problems. For example, if the performance variable is the rate of collisions on an Ethernet segment, when the days-to-threshold number shows that there are only a few days left before the variable exceeds 40%, then the network administrator may want to begin thinking about taking some remedial steps like reconfiguring the network to shift some of the load onto another segment to prevent deterioration of performance.

The entries in the Situations to Watch report are sorted in order of increasing days-to-threshold numbers, with the entries that require the most attention at the top of the report.

Generation of the Bandwidth Utilization Chart

Figure 4:
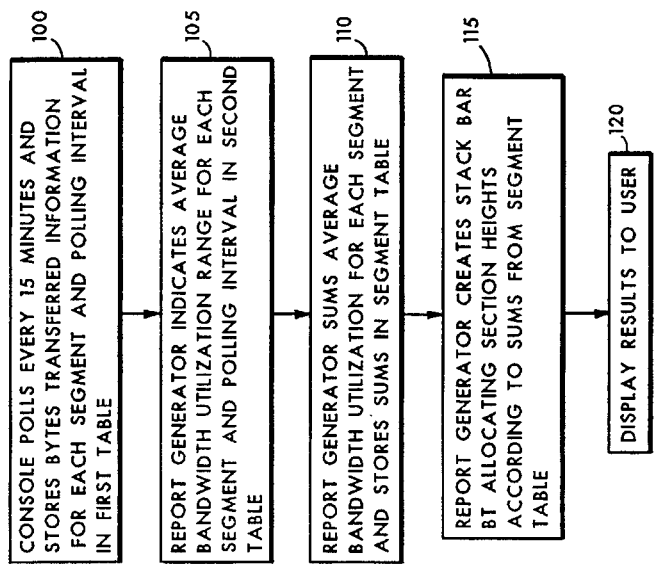
FIG. 4 is a flowchart of the steps for generating the bandwidth utilization chart.

The details of how the bandwidth utilization chart is generated will now be described with reference to the flowchart in FIG. 4 and the tables in FIGS. 5–8.

The console continuously polls all of the segment monitors for various statistics that are maintained by the monitor (step 100). The polling takes place at a regular polling interval (e.g. every 15 minutes) and in the described embodiment, the polling interval is the same for all of the segment monitors but this need not be the case. The particular statistic that is relevant to generating the bandwidth utilization chart is the total number of bytes transferred over the segment.

The count at the network monitor is a total accumulation since some initial time. Thus, the console must compute the number of bytes that have gone over the segment since the last poll of that segment. It does this by maintaining a last_count variable for each segment, which contains the previously received total bytes transferred count that was last received. When the console receives new data in response to the most recent poll of a segment, it subtracts the previously received value stored in the corresponding last_count variable to obtain the total bytes transferred since the last poll.

The console stores the computed number of bytes transferred in a record 44 in a first table 42 (see FIG. 5). The record has a time field 43 for a time stamp indicating when the poll occurred, a segment name field 45 (labeled SN) for the identity of the segment, and a total bytes transferred field 47 for the computed value. As the day progresses, the console continues to add records to the first table. By the end of a day there will be 96 stored records for each segment, assuming, of course, that the polling interval is 15 minutes and that all of the polls receive a response.

At the end of the day, the console runs the report generator. Referring to FIGS. 5 and 6, for every record 44 in the first table 42, the report generator computes the average bandwidth utilization for each segment for each poll time that appears in the first table and enters this information into corresponding records 52 in a second table 50 (step 105). Each record 52 in the second table includes a time stamp field 51, a total bytes transferred field 55, a segment name field 52, and a set of data buckets 54, each representing a different range of possible bandwidth utilization. In the described embodiment, there are ten buckets, each representing about one tenth of the total range of possible values of average bandwidth utilization (i.e., the first bucket represent an average utilization of 0–9%, the second bucket represents an average utilization of 10–19%, etc.).

After computing an average bandwidth utilization for a given poll interval for a given segment, the report generator records the result in a corresponding record 52 in table 50 by entering a 1 in the appropriate bucket and a 0 in all of the other buckets. For example, in FIG. 6, the data bucket 62 representing bandwidth utilization range 0.50–0.59 contains a 1, indicating that average bandwidth utilization for segment number 192.124.24.0 for the polling interval at 11:30 am was between 50% and 59%.

Referring to FIG. 7, to perform the above described computation, the report generator uses information that is stored in a third table 46. The third table contains a record 48 for each segment, each record 48 identifying the segment name and the maximum possible data transfer rate or speed in bytes per second for that segment. For example, in FIG. 7, there is a record 48 for segment 192,124.24.0 indicating that its maximum speed is 1.25 MB per second.

The report generator computes the average bandwidth utilization for a given polling interval as follows:

$$\text{AVG. BANDWIDTH UTIL.} = \text{BYTES TRANSFERRED}/\text{SPEED} \times \text{TIME} \quad (1)$$

BYTES TRANSFERRED is obtained from the corresponding record of the second table 50 and TIME is equal to the duration of the period for which the bytes transferred count applies. More specifically, TIME is equal to the time of the current record minus the time of the last preceding record for that segment found in the first table. If a record has been entered for every polling interval and the polling interval is 15 minutes, the time will be 900 seconds. On the other hand, if data was not received for the last preceding polling cycle, possibly due to a network problem or monitor that was offline, the computed time interval will be longer.

The report generator repeats the above-described procedure for each record 44 in the first table 42 to produce a corresponding record 52 in the second table 50.

After the second table has a complete set of records for all of the segments for the relevant period of time (e.g. a day), the report generator uses that information to generate a segment table 56 that includes a single record 58 for each segment (see FIG. 8). Each record in the segment table contains a segment name field 59; ten data buckets 60, corresponding to the ten data buckets 54 in the records 52 of the second table 50; and poll count field 63 for the total number of polling cycles represented by the period of time to which the record corresponds.

For a given record 58 in the segment table 56 (i.e., a record corresponding to a particular segment), the report generator computes the entries for the data buckets from the records 52 for that segment in the second table 50 (step 110). First, the report generator finds all of the records in the second table 50 that contain data for that segment and that are for the selected period of time that is to be displayed. Then, to determine the entry for each data bucket 54 of the corresponding record in the segment table, the report generator sums the data in the corresponding data bucket in all of the located records from the second table. That is, the report generator counts the number of ones that appear in the corresponding data buckets in the relevant records of the second table. This is done for each data bucket of the segment table record.

To complete the segment table, the above described procedure is repeated for each segment in the network.

From the completed segment table, the report generator then produces a stack bar for each segment (step 115). To generate the stack bar for a particular segments the report generator calculates the percentage of the day that the segment was operating within one of the utilization ranges represented by one of the data buckets. That is, the report generator divides the entry in the appropriate bucket of the relevant segment table record by the total number of polls that were possible for that period of time (i.e., the entry in field 63) and multiplies the result by 100 to produce a percentage. This yields the relative size of the corresponding section of the stack bar. To obtain the size of the rest of the sections of the stack bar, the report generator performs the same computation for each of the remaining utilization ranges (i.e., for each of the data buckets). The relative percentages determine the relative heights of the corresponding sections of the stack bar for that segment.

The report generator employs the same procedure to generate the stack bars for all of the other segments for which bandwidth utilization will be displayed in the stack bar chart.

It should be noted that if data for some of the polling cycles was not received, the total number of polls represented in the segment table will be less than the total number of possible polls for the day. In that case, the height of the stack bar (i.e., the combined height of the individual sections) will be less than 100%. In other words, when a "white space" appears at the top of the bar this indicates to the network administrator that some problem interfered with the collection of data for that segment. The size of the white space indicates how serious the problem was. The problem could have been caused by one or more of any number of reasons such as a faulty monitoring device, a connectivity problem somewhere in the path between the console and a monitoring device, or even the console being offline because it was being rebooted. Though the source of the problem may be uncertain, the presence of the white space alerts the network administrator a problem that may have to be investigated.

When the bandwidth utilization chart has been completed, it is displayed on the display screen at the console or printed out as a hard copy using the printer connected to the console (step 120).

Generation of the Situations to Watch Chart

For purposes of describing how the report generator derives the days-to-threshold number that appears in the Situations to Watch Chart, Ethernet utilization will be selected as the relevant network variable. It should be understood, however, that the technique is and can be used for a wide range of network performance and utilization variables. For example, FIG. 3, which is an example of "Situation to Watch" chart presents eight other variables for which the days-to-threshold number was generated.

Generating a days-to-threshold prediction requires that polled data be collected on the relevant variable for a baseline period (e.g. 3–6 weeks). The console collects the required data in the manner previously described, namely, by repeatedly polling all of the network monitors throughout the network at regular polling intervals. The collected data is stored in a database of records, each record containing the data for a particular polling time and for a particular segment. Since we are using bandwidth utilization as the relevant variable for this example, the table will contain at least the information shown in FIG. 5. However, in an actual application which generates a days-to-threshold number for many different variables, the record would have many more fields, namely, one field for each additional variable for which data is collected.

Figure 9:
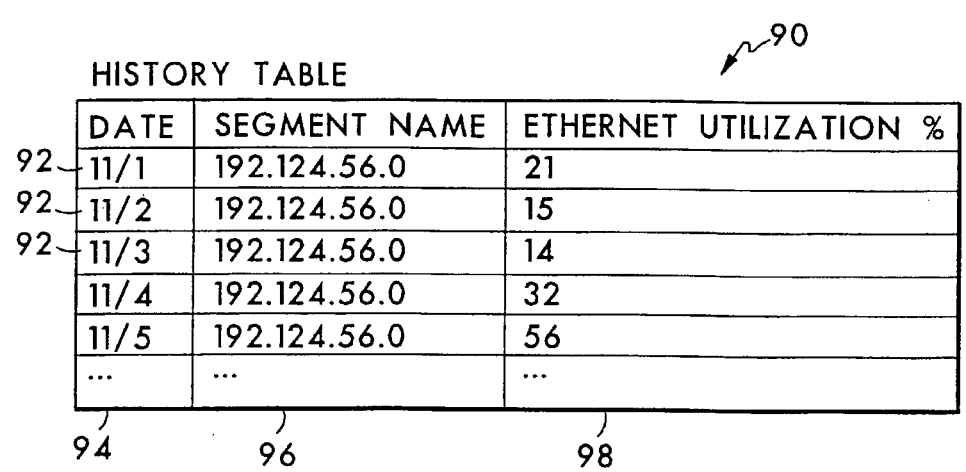
FIG. 9 shows the structure of the history table data structure.

From the polled data that is accumulated in the database at the console, the report generator produces a history table 90, such as is shown in FIG. 9. The history table 90 includes a record 92 for each day of a baseline period. Each record contains a time field 94, a segment name field 96, and a utilization field 98. In the described embodiment, the granularity of the data that is stored in the history table is one day. Thus, the entry that is placed in the time field is the day for which the data corresponds. The name of the segment for which the data is collected is stored in the segment name field. And the average utilization as a percentage of total capacity is stored in the utilization field.

The report generator produces the entry for the utilization field of a particular record from the data stored in table 42 (see FIG. 5) by summing the utilization data for that segment over the period of interest, i.e., the specified day, and by dividing the total by the maximum bytes of data that could have been transferred over that segment during that period of time times 100 to generate a percentage. The maximum number of bytes of data for the day is simply the speed of the segment (as found in table 46 shown in FIG. 7) times the relevant period of time (i.e., one day). Thus, each record contains a value indicating an average Ethernet utilization as a percent of maximum utilization for one day.

In essence, the report generator simply rolls up the data that is kept in the first table at a fine level of granularity to produce data that is stored in the history table at a much a coarser level of granularity (e.g. a day). Although it is acceptable to use the Ethernet utilization statistics from the first table without rolling it up to a coarser level of granularity, that higher level of resolution (i.e., data for each 15 minute interval) is unnecessary for generating a the days-to-threshold number.

In the described embodiment, for the segment for which the days-to-threshold computation is being performed, the report generator stores data for a baseline period of three to six weeks. All of the stored data for the baseline period of time is then used by the report generator to predict the growth of the Ethernet utilization into the future. It is important to select a baseline period that is sufficiently long to assure so that the prediction that will be performed is meaningful. If too short a period is used, the days-to-threshold number may behave erratically and may take on unrealistic values. On the other hand, it is also desirable to limit the amount of data that is used to predict future growth trends in the variable. If too long a period is used, the resulting days-to-threshold value may become too insensitive to changes in a performance variable.

Figure 10:
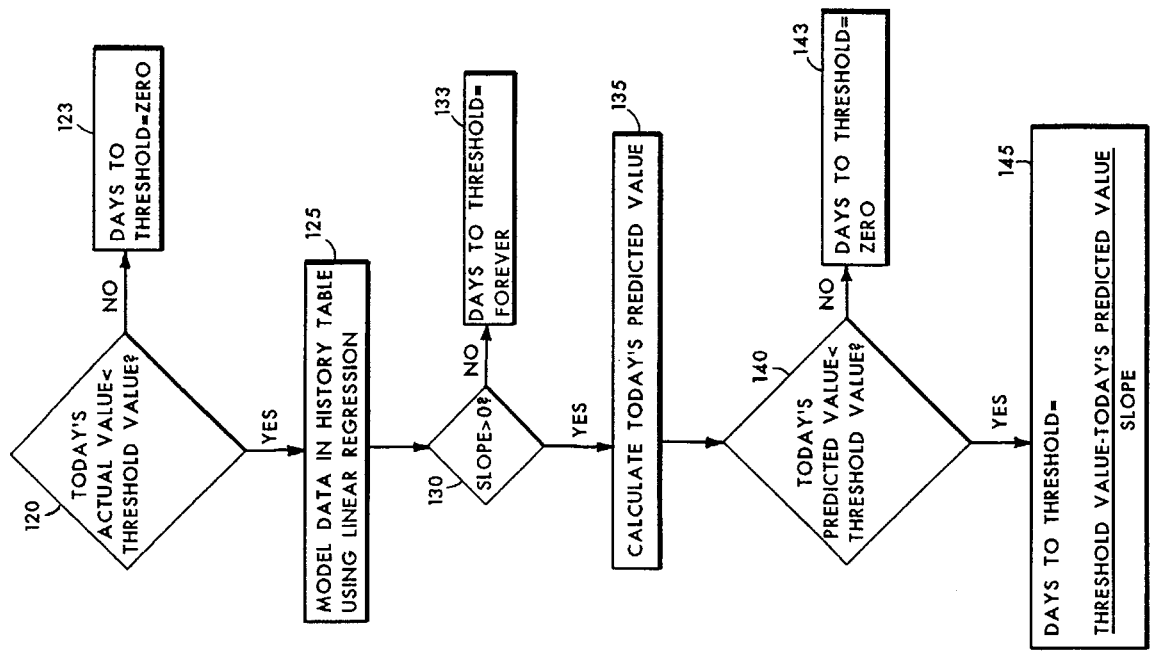
FIG. 10 is a flowchart of the steps for computing the days-to-threshold number.

With the history table 90 fully populated with data for the required baseline period, the report generator then computes predicted growth of the selected variable as a function of time. Referring to FIG. 10, at the start of the prediction procedure, the report generator checks whether the value of actual Ethernet utilization for the current day (i.e., today's actual value) is below the threshold value (step 120). If today's actual value is not below the threshold value, indicating that the threshold has already been reached, the days-to-threshold number is set to zero and the prediction routine terminates (step 123).

If today's actual value is below the threshold value, the report generator uses a standard linear regression technique to model the trend in the utilization data in the history table (step 125). In other words, the report generator fits a line to the data by finding the line which produces the least squares error. As can be found in any standard text on statistics, the equation for the least squares error line is:

$$y = \beta_0 + \beta_1 x \quad (2)$$

$$\beta = \frac{SS_{xy}}{SS_{xx}} \quad (3)$$

$$SS_{xy} = \sum_{i=1}^{n} x_i y_i - \frac{\left(\sum_{i=1}^{n} x_i\right)\left(\sum_{i=1}^{n} y_i\right)}{n} \quad (4)$$

$$SS_{xx} = \sum_{i=1}^{n} x_i^2 - \frac{\left(\sum_{i=1}^{n} x_i\right)^2}{n} \quad (5)$$

where n is the number of records, $x_i$ is a time for the $i^{th}$ record, and $y_i$ is the average utilization stored in the $i^{th}$ record.

The slope, $\beta_1$, represents the rate of growth of the variable. Knowing both the slope and the intercept, $\beta_0$, of the least squares line enables the report generator to determine how many days hence the line will cross the threshold level.

Figure 11:
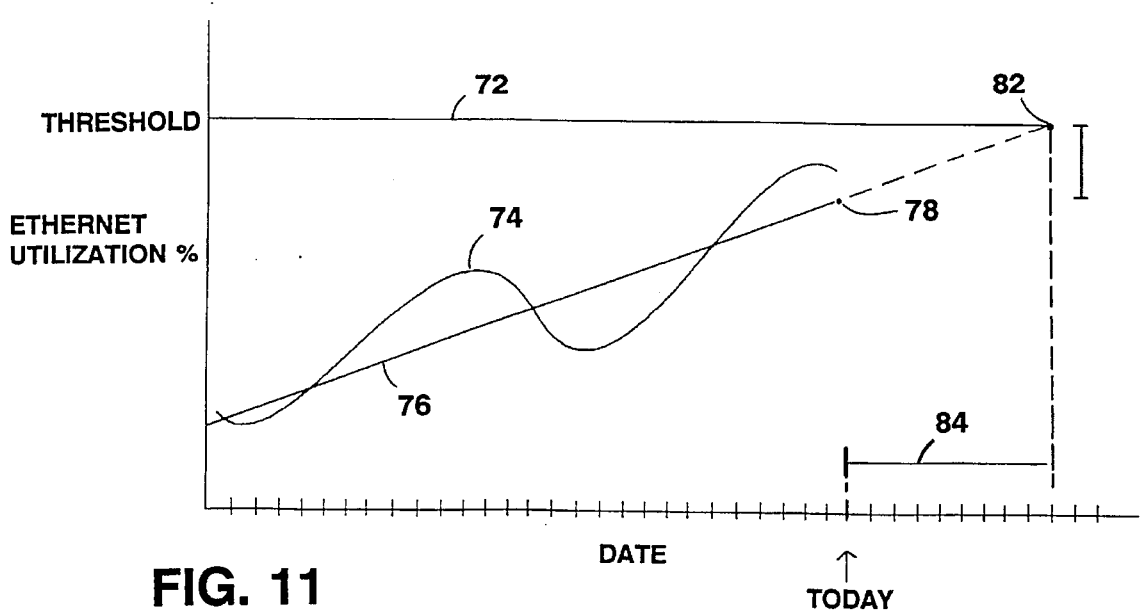
FIG. 11 is a graphical illustration of how the days-to-threshold prediction is computed.

As an aid to visualizing the computations that are performed, it is useful to refer to FIG. 11 which presents a graph of an exemplary plot 74 of utilization data from a history table. In that graph, the horizontal axis represents time in days and the vertical axis represents average utilization in percent of total bandwidth. The threshold level is represented by a horizontal line 72. The linear regression analysis produces a line 76 that best fits the data. The slope of line 76 indicates Ethernet bandwidth utilization growth per day. The point labeled 78 represents the predicted bandwidth utilization for the current day and point 82 indicates the point at which the predicted growth of the variable reaches the threshold value. The difference in days between the current data and the date on which the variable is predicted to reach threshold is the days-to-threshold number.

Before computing a days-to-threshold number from the least squares line, the report generator checks whether the slope, $\beta_1$, is positive (step 130). If the slope is not positive, indicating that Ethernet utilization is not growing, the days-to-threshold number is set to "Forever" and the procedure for determining days-to-threshold for that segment variable terminates (step 133).

If the slope is positive, a predicted value for today's Ethernet utilization is computed using equation for the line (step 135). The report generator next checks whether the predicted value for the current day is below the threshold value (step 140). If predicted value for the current day is equal to or above the threshold value, the days-to-threshold number is set to zero (step 143).

Finally, if the predicted value the current day is below the threshold value, the report generator computes a days-to-threshold number, i.e., a number of days remaining until Ethernet utilization for the segment reaches the threshold value (step 145). The days-to-threshold number is computed by dividing the difference between the threshold value and today's predicted value by the slope, $\beta_1$.

In a similar way, the report generator computes a days-to-threshold number for other performance variables such as collisions, Ethernet errors, Token Ring utilization, Token Ring hard errors, Token Ring soft errors, or broadcast or multicast utilization, just to name a few.

After calculating days-to-threshold numbers for all segments and all performance variables of interest, the report generator produces the Situations to Watch Report 40 (see FIG. 6). Each entry in the report includes the segment name, the identity of the variable that is being monitored, the current average value for that variable, the threshold value for the variable, and the days to threshold. The report generator sorts the entries in order of increasing days to threshold and displays them starting with the entry that has the fewer days to threshold.

Though a simple linear regression technique was used to model the data, more sophisticated or complex techniques and algorithms could be used to model the data and predict future growth of the relevant variable.

Other embodiments are within the following claims. For example, the invention can be used to display any performance variable for a resource that is accessible over a network and which takes on different values over a period of time. Examples of such variables include response times for computer applications, an index of overall performance of a network or a portion of a network, the number of users of a network, E-mail usage, accesses to a database, and use of a database program.

Also, the days-to-threshold prediction can be used to estimate when a performance variable is estimated to fall below a specific threshold level. This may be particularly useful, for example, to alert a network administrator of an over capacity which is being paid for but not used.

What is claimed is:

1. A method of displaying information relating to performance of a computer resource over a selected period of time, said computer resource connected to a communication network, said method comprising:

from a location on said network that is remote from said computer resource, periodically sampling over said network data relating to performance of said resource so as to generate stored values for a selected performance variable for said resource, said periodic sampling taking place over the selected period of time and wherein said selected performance variable takes on values within a range of possible values;

dividing the range of possible values for said selected performance variable into a plurality of subranges;

for each subrange, determining for what proportion of the selected period, the values of the selected performance variable fall within that subrange; and for each subrange, displaying in graphical form the proportion of the selected period of time that the values of the selected performance variable fell within that subrange.

2. The method of claim 1 wherein the step of determining comprises:

first determining for each of said stored values of said preselected performance variable within the preselected period of time which of said plurality of subranges it falls into; and then, counting the number of times that a stored value falls into each of said subranges to determine for what proportion of the preselected period the values of the preselected performance variable fall within that subrange.

3. A method of reporting information about a resource that is connected to a communications network, said method comprising:

from a location on said network that is remote from said computer resource, periodically sampling over said network data relating to performance of said resource so as to generate stored values for a selected performance variable for said resource;

collecting stored values representing a baseline period of time;

setting a threshold value for the selected performance variable;

analyzing the stored values representing said baseline period to predict a time-to-threshold number, said time-to-threshold number being an amount of time that is expected to elapse from a present time to a later time at which a predicted value of the selected performance variable will reach said threshold value; and generating a report that presents the time-to-threshold number for the selected performance variable.

4. A method of displaying information relating to performance of a computer resource during a selected period of time, said computer resource connected to a communication network, said method comprising:

from a location on said network that is remote from said computer resource, collecting over said network data relating to a selected performance variable for said resource so as to generate stored values for the selected performance variable at a plurality of times during the selected period of time, wherein the stored values for said selected performance variable fall within a range of possible values;

dividing the range of possible values for said selected performance variable into a plurality of subranges;

for each subrange, determining for what proportion of the selected period, the stored values of the selected performance variable fall within that subrange; and for each subrange, displaying in graphical form the proportion of the selected period of time that the values of the selected performance variable fell within that subrange.

5. The method of claim 4 wherein the step of collecting comprises periodically sampling accumulated data.

6. The method of claim 4 wherein the selected performance variable is utilization.

7. The method of claim 4 wherein the selected performance variable is bandwidth utilization.

8. The method of claim 4 wherein the step of displaying in graphical form comprises generating a stack bar.

9. The method of claim 8 wherein the stack bar is divided into a plurality of regions each representing a corresponding one of said subranges and for each region, the stack bar shows a proportion of the selected period of time that an average of the performance variable actually spent in the corresponding subrange.

10. The method of claim 8 wherein the selected performance variable is bandwidth utilization and wherein the stack bar is divided into a plurality of regions each representing a corresponding one of said subranges and for each region, the stack bar shows a proportion of the selected period of time that average actual bandwidth utilization spent in the corresponding subrange.

11. The method of claim 10 wherein the step of displaying further comprises setting a length of each region of the stack bar to indicate the proportion of the selected period of time that average actual bandwidth utilization spent in the range of bandwidth utilization associated with that region spent in that range by the performance variable.

12. The method of claim 8 wherein the stack bar is divided into a plurality of regions each representing a corresponding one of said subranges and wherein the step of displaying further comprises highlighting each region of the stack bar to identify the corresponding subrange for that region.

13. The method of claim 12 wherein the step of highlighting comprises coloring each region of the stack bar with a different color.

14. The method of claim 12 wherein the step of highlighting comprises shading each region of the stack bar with a different shading.

15. A method of reporting information about a resource that is connected to a communications network, said method comprising:

from a location on said network that is remote from said computer resource, gathering over said network data relating to a selected performance variable of said resource so as to generate stored values for the selected performance variable for said resource;

collecting stored values representing a baseline period of time;

setting a threshold value for the selected performance variable;

analyzing the stored values representing said baseline period to predict a time-to-threshold number, said time-to-threshold number being an amount of time that is expected to elapse from a present time to another time at which a predicted value of the selected performance variable is expected to reach said threshold value; and generating a report that presents the time-to-threshold number for the selected performance variable.

16. The method of claim 15 wherein said another time is a positive number.

17. The method of claim 15 wherein the performance variable is a utilization statistic.

18. The method of claim 15 wherein the utilization statistic is selected from the group consisting of number of bytes transferred, broadcast utilization, bandwidth utilization, and multicast utilization.

19. The method of claim 15 wherein the performance variable is selected from the group consisting of number of collisions, number of errors, number of hard errors, and number of soft errors.

20. The method of claim 15 wherein the step of analyzing comprises using a statistical regression technique to model trends.

* * * * *

UNITED STATES PATENT AND TRADEMARK OFFICE
CERTIFICATE OF CORRECTION

PATENT NO.  : 5,615,323

DATED       : March 25, 1997

INVENTOR(S) : Ferdinand Engel, Wilson T. MacDonald, Arthur P. Hamlin

It is certified that error appears in the above-identified patent and that said Letters Patent is hereby corrected as shown below:

Col. 4, l. 50, insert --23-- after "screen".

Col. 7, l. 49, "segments" should be --segment,--.

Signed and Sealed this

Ninth Day of March, 1999

Attest:

Q. TODD DICKINSON

Attesting Officer

Acting Commissioner of Patents and Trademarks